(12) United States Patent
Katagiri

(10) Patent No.: US 7,278,148 B2
(45) Date of Patent: Oct. 2, 2007

(54) DATA RECORDING/REPRODUCTION APPARATUS

(75) Inventor: Susumu Katagiri, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 80 days.

(21) Appl. No.: 10/653,221

(22) Filed: Sep. 3, 2003

(65) Prior Publication Data

US 2004/0042378 A1    Mar. 4, 2004

Related U.S. Application Data

(63) Continuation of application No. 09/722,715, filed on Nov. 28, 2000, now Pat. No. 6,639,891.

(30) Foreign Application Priority Data

Dec. 3, 1999    (JP) .............................. 11-345075

(51) Int. Cl.
G11B 17/30    (2006.01)
(52) U.S. Cl. .................................... 720/675
(58) Field of Classification Search ................ 369/255, 369/215, 132, 244, 253, 258, 249; 720/675, 720/674, 691, 677, 679; 360/132
See application file for complete search history.

(56) References Cited

U.S. PATENT DOCUMENTS

| | | | |
|---|---|---|---|
| 5,657,303 A * | 8/1997 | Namoto et al. ........... | 369/44.32 |
| 5,768,248 A * | 6/1998 | Lee ............................. | 720/675 |
| 5,982,735 A | 11/1999 | Tsai | |
| 6,044,057 A * | 3/2000 | Park et al. ................... | 720/675 |
| 6,137,765 A | 10/2000 | Saito et al. | |
| 6,414,934 B1 * | 7/2002 | Akiba ......................... | 720/675 |
| 6,775,837 B1 * | 8/2004 | Makita ........................ | 720/690 |

FOREIGN PATENT DOCUMENTS

| | | |
|---|---|---|
| JP | 62-014328 | 1/1987 |
| JP | 62-052725 | 3/1987 |
| JP | 64-12217 | 1/1989 |
| JP | 5-36608 | 5/1993 |
| JP | 08-161756 | 6/1996 |
| JP | 10-69650 | 3/1998 |

(Continued)

OTHER PUBLICATIONS

Partial English Translation of Japanese Laid-Open Utility Model Application No. 64-12217.

*Primary Examiner*—Angel C. Castro
*Assistant Examiner*—Christopher R. Magee
(74) *Attorney, Agent, or Firm*—Dickstein Shapiro LLP

(57) ABSTRACT

A data recording/reproduction apparatus is provided, which apparatus includes a spindle motor which is held by a base body and rotates an optical disk, an optical pickup which projects a laser beam into a spot on the optical disk for data recording/reproduction, first and second support mechanisms provided on the base body, and a seek mechanism which is held by the first and second support mechanisms so as to be freely tilted with respect to the base body and actuates the optical pickup in radial directions of the optical disk. The first support mechanism is vertically movable in directions of a thickness of the optical disk so that a tilt of the optical pickup with respect to the optical disk is adjusted.

12 Claims, 7 Drawing Sheets

FOREIGN PATENT DOCUMENTS

| | | |
|---|---|---|
| JP | 10-112122 A1 | 4/1998 |
| JP | 10-208372 A1 | 8/1998 |
| JP | 10-269579 | 10/1998 |
| JP | 10-269584 | 10/1998 |
| JP | 11-025466 A1 | 1/1999 |
| JP | 11-066570 | 3/1999 |
| JP | 11-149724 A1 | 6/1999 |
| JP | 11-288519 | 10/1999 |
| JP | 2001-101670 | 4/2001 |

\* cited by examiner

DATA RECORDING/REPRODUCTION APPARATUS

This application is a continuation of application Ser. No. 09/722,715 filed Nov. 28, 2000 now U.S. Pat. No. 6,639,891 which is hereby incorporated by reference.

BACKGROUND OF THE INVENTION

1. Field of the Invention

The present invention generally relates to data recording/reproduction apparatus for optical disks, which apparatus each include an optical pickup which can record, reproduce, or erase data by projecting a laser beam into a spot on an optical disk such as a compact disk (CD) or a digital versatile disk (DVD), and more particularly to a data recording/reproduction apparatus which can adjust a tilt and a height of the optical pickup with respect to an optical disk.

2. Description of the Related Art

As a recent trend, optical disks have been shifting from CDs to DVDs, each of which includes a storage capacity approximately seven times as large as that of a CD. To comply with the increase in the storage capacity, it is required of an optical pickup to reduce a diameter of a beam spot formed on an optical disk by a laser beam projection. Therefore, a wavelength of a laser beam projected from a light source of a semiconductor laser is reduced, and a numerical aperture (NA) of an objective lens is increased, causing a tilt of the objective lens with respect to the optical disk to become an important point.

In other words, when the objective lens is tilted with respect to the optical disk, a coma is caused in the beam spot. The larger the numerical aperture, the more easily the coma is caused. The coma deteriorates performance of the beam spot, thus worsening jitter (instability of information data in its time-axial direction) at a time of recording or reproduction.

Therefore, a common DVD drive adjusts a tilt angle formed between an optical disk and an objective lens. With respect to means for such an adjustment, a large number of technologies have already been disclosed in patent applications. For example, Japanese patent application Nos. 10-69650, 10-112122, and 10-208372 each disclose a recording/reproduction apparatus which mounts a spindle motor on a plate whose tilt with respect to a base body is adjustable so as to adjust a tilt angle formed between an optical disk and an objective lens.

Further, Japanese patent application Nos. 11-25466 and 11-149724 each disclose a recording/reproduction apparatus which adjusts a tilt of a guide shaft which guides movements of an optical pickup in radial directions of an optical disk.

That is, these prior art technologies are roughly divided into two types: a first type which adjusts a spindle motor on which an optical disk is placed and a second type which adjusts an optical pickup which includes an objective lens.

With respect to the first type of prior art technologies, rigidity for supporting the spindle motor is reduced because the spindle motor is not directly fixed to the base body. Therefore, when the optical disk is rotated, strong vibrations are caused by rotational movements of the spindle motor. A DVD drive is required to record/reproduce data on/from a CD as well, and a rotational speed thereof has increased lately to reach a maximum of 10,000 rpm. In the case of a spindle motor with such a high rotational speed, vibrations are generated in an optical disk or an optical pickup without high rigidity for supporting the spindle motor, thus causing instabilities in recording/reproduction operations. If a CD or a DVD has an eccentricity, strong vibrations are caused. In such a case, if rigidity for supporting the spindle motor is low, great vibrations are transmitted to the optical disk or the optical pickup.

Further, the optical disk is tilted by tilt-adjusting the spindle motor. Therefore, in the case of using a cartridge housing an optical disk, the optical disk may touch the inner wall of the cartridge by being tilt-adjusted in the cartridge.

With respect to the second type of prior art technologies, the guide shaft, which is a seek-type guide unit for actuating the optical pickup in radial directions of an optical disk (or for an access operation of the optical pickup), is tilted. However, since guide rails are not directly fixed to a base body, rigidity for supporting the optical pickup is reduced. Therefore, strong vibrations are caused during a high-speed access operation of the optical pickup.

SUMMARY OF THE INVENTION

It is a general object of the present invention to provide a data recording/reproduction apparatus in which the above-described disadvantages are eliminated.

A more specific object of the present invention is to provide a data recording/reproduction apparatus which can make a tilt adjustment without reducing rigidity for supporting an optical disk or an optical pickup.

The above objects of the present invention are achieved by a data recording/reproduction apparatus including a spindle motor which is held by a base body and rotates an optical disk, an optical pickup which projects a laser beam into a spot on the optical disk for data recording/reproduction, first and second support mechanisms provided on the base body, and a seek mechanism which is held by the first and second support mechanisms so as to be freely tilted with respect to the base body and actuates the optical pickup in radial directions of the optical disk, wherein the first support mechanism is vertically moved in directions of a thickness of the optical disk so that a tilt of the optical pickup with respect to the optical disk is adjusted.

According to the above-described structure, a tangential tilt adjustment can be made by changing the structure of one of the support mechanisms of a conventional radial tilt servomechanism without incorporating any special mechanism thereinto. Since the load of a tangential tilt mechanism according to this structure does not cause the deterioration of rigidity for supporting the optical disk or the optical pickup, a high-speed rotation of the optical disk or a high-speed access of the optical pickup is prevented from being hindered.

The above objects of the present invention are also achieved by a data recording/reproduction apparatus including a spindle motor which is held by a base body and rotates an optical disk, an optical pickup which projects a laser beam into a spot on the optical disk for data recording/reproduction, first and second support mechanisms which are provided on the base body and are vertically movable in directions of a thickness of the optical disk and a seek mechanism which is held by the first and second support mechanisms so as to be freely tilted with respect to the base body and actuates the optical pickup in radial directions of the optical disk, wherein the first support mechanism is vertically movable so that a tilt of the optical pickup with respect to the optical disk is adjusted, and the first and second support mechanisms are vertically movable so that a height of the optical pickup with respect to the optical disk is adjusted.

According to the above-described structure, the tangential tilt adjustment can be made by moving and adjusting one of the first and second support members, and the height of the optical pickup can be adjusted by moving and adjusting the first and second support members.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of embodiments of the present invention.

Figure 1:
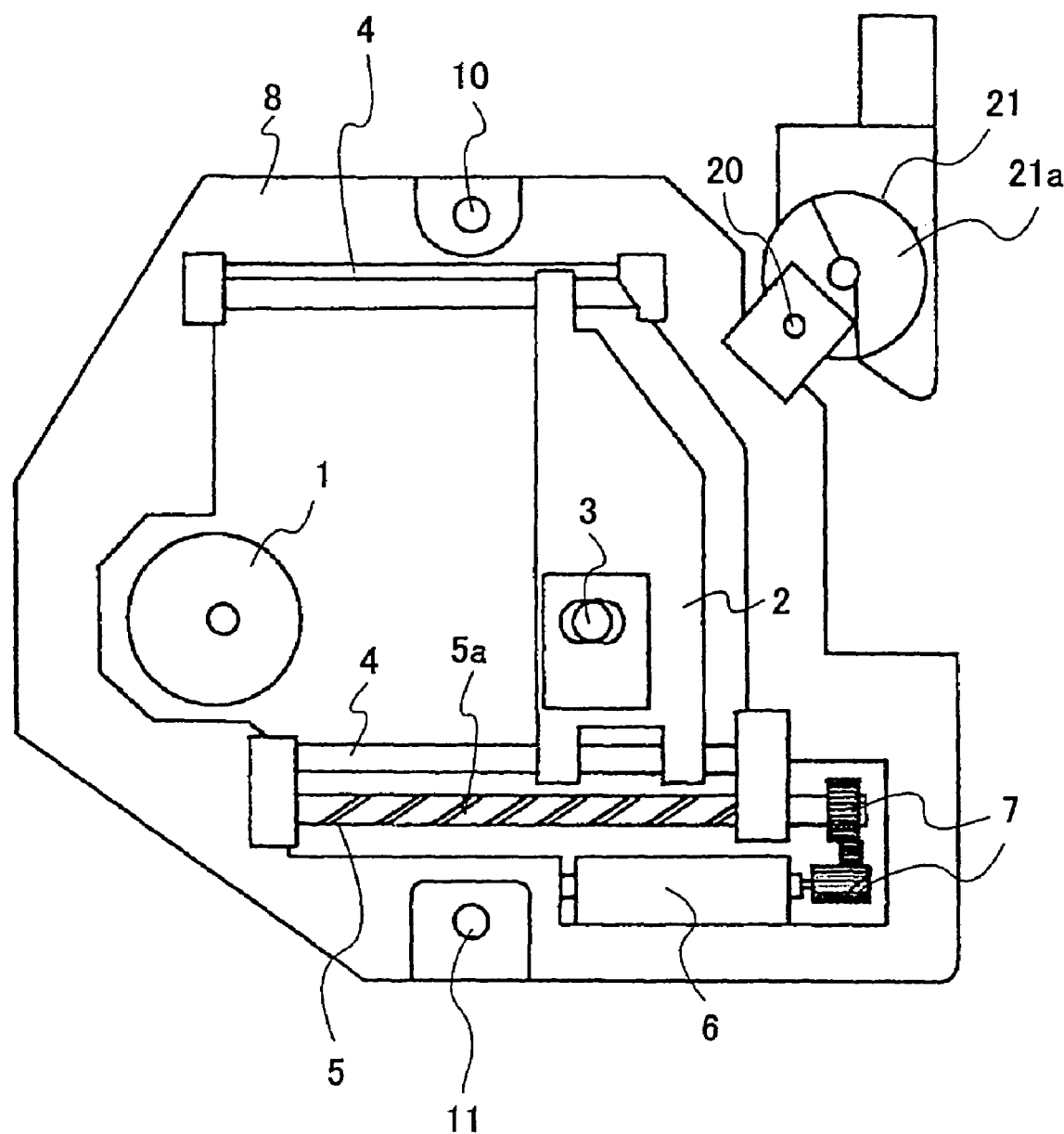
FIG. 1 is a plan view of a seek mechanism of a recording/reproduction apparatus according to a first embodiment of the present invention.
Figure 2:
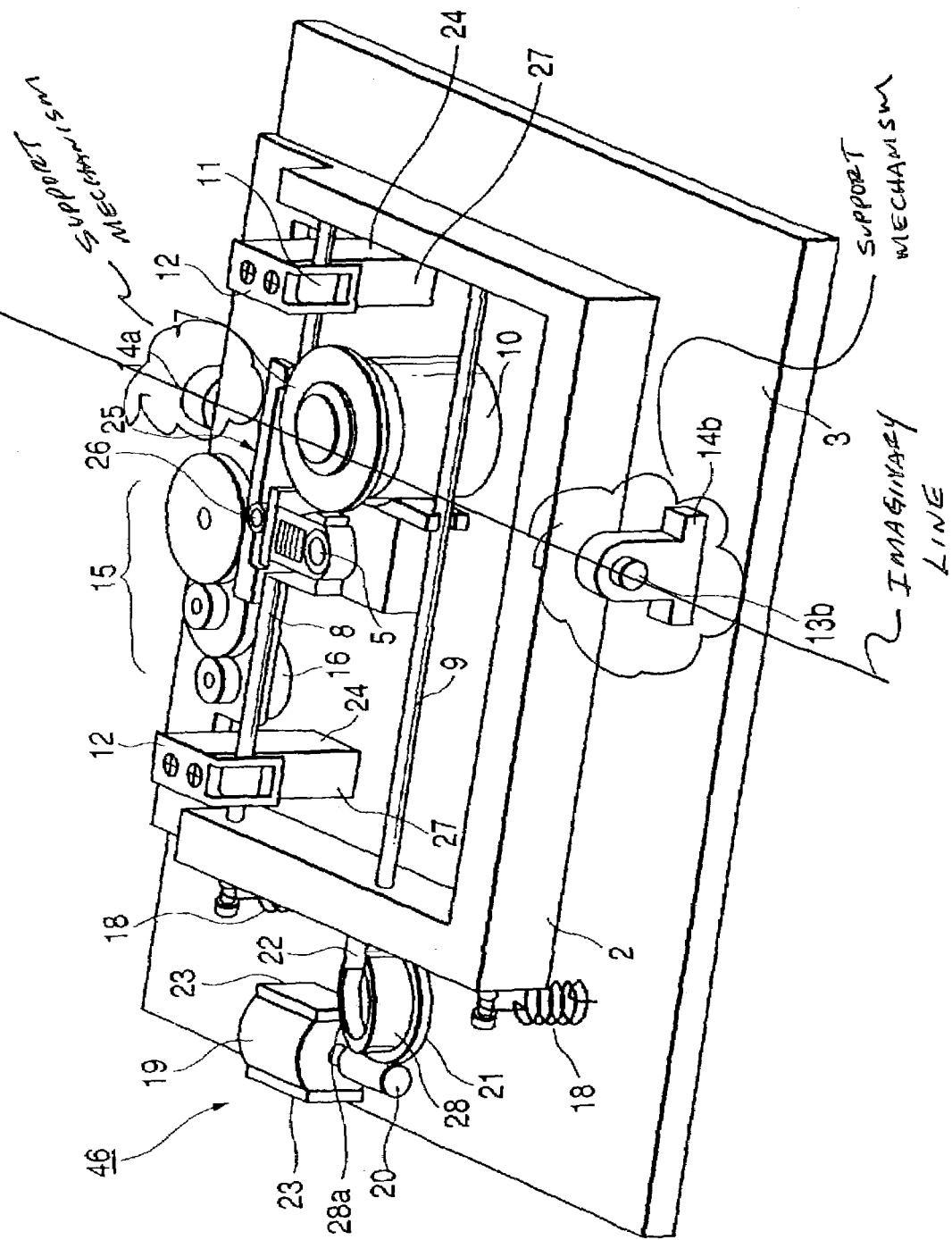
FIG. 2 is an exploded perspective view of the seek mechanism of FIG. 1.

FIG. 1 is a plan view of a seek mechanism of a recording/reproduction apparatus according to a first embodiment of the present invention. FIG. 2 is an exploded perspective view of the seek mechanism shown in FIG. 1. In FIG. 2, an adjustment structure of the seek mechanism is shown.

According to FIG. 1, the seek mechanism includes a spindle motor 1, an optical pickup 2 of a known structure, an objective lens 3 included in the optical pickup 2, guide rails 4 for guiding the optical pickup 2 in seek directions, a lead screw 5, a seek motor 6 which provides the lead screw 5 with a rotational driving force via gears 7, and a rotating chassis 8 which holds the guide rails 4, the lead screw 5, and the seek motor 6. The spindle motor 1 is fixed to a later-described fixed chassis 12 shown in FIG. 2, and rotates an optical disk (not shown). The optical pickup 2 includes photoelectric elements (not shown) for receiving a light reflected from the optical disk. The objective lens 3 gathers a laser beam and focuses the laser beam into a beam spot on the optical disk at a time of recording, reproducing, or erasing data. The lead screw 5 has a thread groove 5a formed spirally thereon, which groove engages with a connecting claw portion (not shown) provided to the optical pickup 2. The lead screw 5 rotates circumferentially to move the optical pickup 2.

As shown in FIG. 1, first and second pivot portions 10 and 11, which serve as support mechanisms, are formed on first and second sides of the rotating chassis 8, respectively, which first and second sides oppose each other in a direction perpendicular to the seek directions. As shown in FIG. 2, the first and second pivot portions 10 and 11 are supported by the fixed chassis 12, which is a base body to which the spindle motor 1 is fixed, and support the rotating chassis 8 so that the rotating chassis 8 is movable in its rotational directions about a line perpendicular to a line connecting the first and second pivot portions 10 and 11. The fixed chassis 12 includes holding arm portions 15 and 16 for holding a cylinder-like first pivot-receiving member 13 and a rectangular second pivot-receiving member 14, respectively. The first and second pivot-receiving members 13 and 14 are pedestals for receiving the first and second pivot portions 10 and 11, respectively. The first and second pivot portions 10 and 11 are pressed onto the respective first and second pivot-receiving members 13 and 14 by respective pressing springs 17 and 18 fixed to the fixed chassis 12.

A driven portion 20 is provided in a corner of the rotating chassis 8. The driven portion 20 contacts a cam surface 21a of a driving cam 21, which is rotated by a drive source (not shown). The height of the cam surface 21a varies. The driven portion 20 is pressed onto the cam surface 21a of the driving cam 21 by a pressing spring 22 fixed to the fixed chassis 12.

Figure 3:
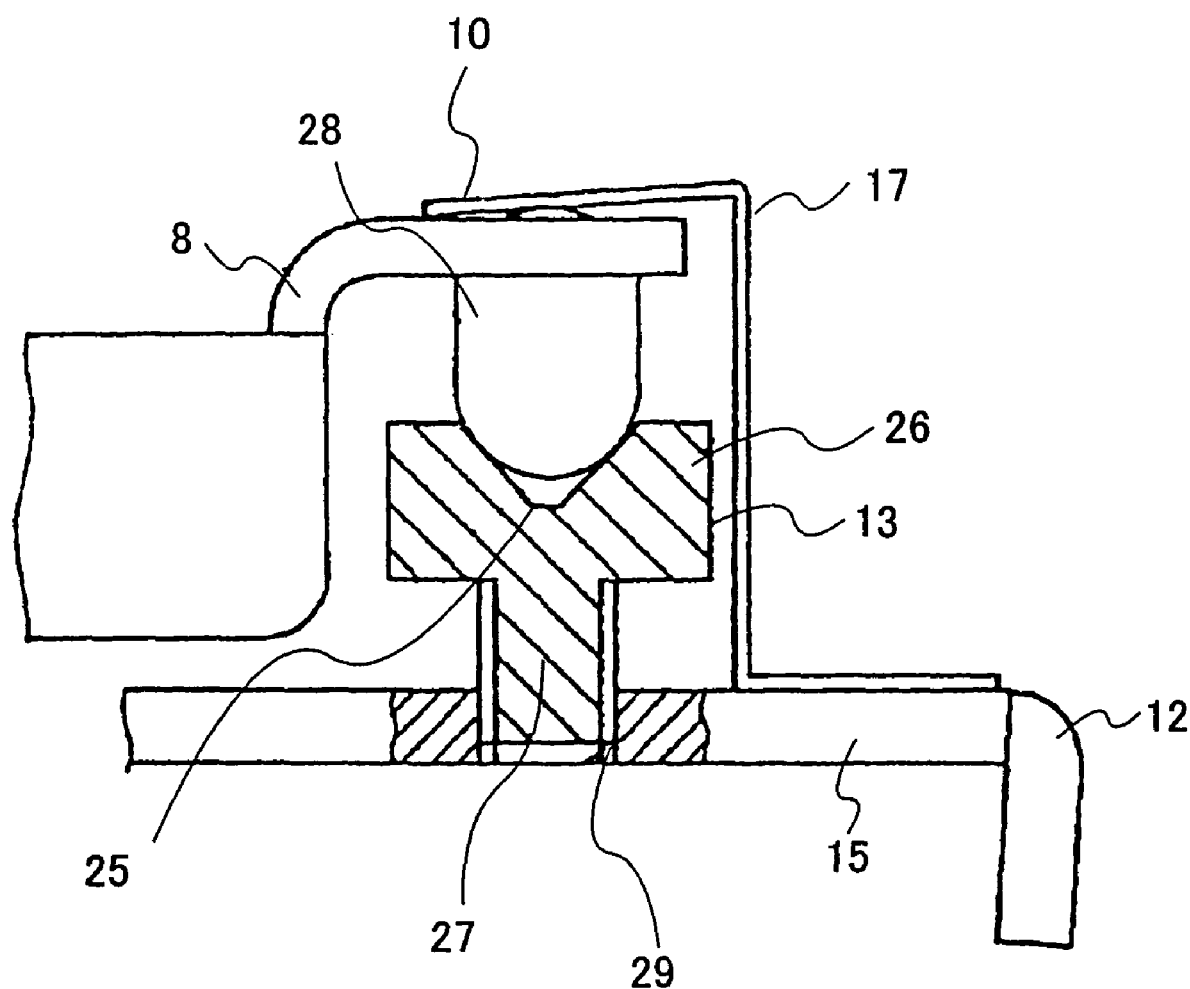
FIG. 3 is an enlarged cross-sectional view of a support mechanism of a pivot portion according to the first embodiment of the present invention.

FIG. 3 is an enlarged cross-sectional view of the support mechanism of the pivot portion 10 according to the first embodiment of the present invention. The first pivot-receiving member 13 includes a head portion 26 having a concave portion 25 formed in its top portion and a male screw portion 27 formed under the head portion 26. A drooping pin 28, which extends in a downward direction of the pivot portion 10, is placed in the concave portion 25. The upper surface of the drooping pin 28 is pressed in the downward direction by the pressing spring 17. The male screw portion 27 engages with a female screw portion 29 formed in the holding arm portion 15 of the fixed chassis 12 so as to be movable in upward and downward directions.

Therefore, according to the first embodiment, the first pivot-receiving member 13, by being rotated, can be moved vertically in directions indicated by a double-headed arrow A in FIG. 2. At this point, the rotating chassis 8 is tilted by fixing the second pivot-receiving member 14. Directions in which the rotating chassis 8 is tilted are the rotational directions in which the rotating chassis 8 is movable about the line perpendicular to the line connecting the first and second pivot portions 10 and 11, that is, the directions of a tangential tilt adjustment with respect to the optical pickup 2.

According to the first embodiment, the tangential tilt adjustment can be made by changing the structure of one of the support mechanisms of a conventional radial tilt servo-mechanism without incorporating any special mechanism thereinto. Since the load of a tangential tilt mechanism according to this embodiment does not cause the deterioration of rigidity for supporting the optical disk or the optical pickup 2, a high-speed rotation of the optical disk or a high-speed access of the optical pickup 2 is prevented from being hindered.

Figure 4:
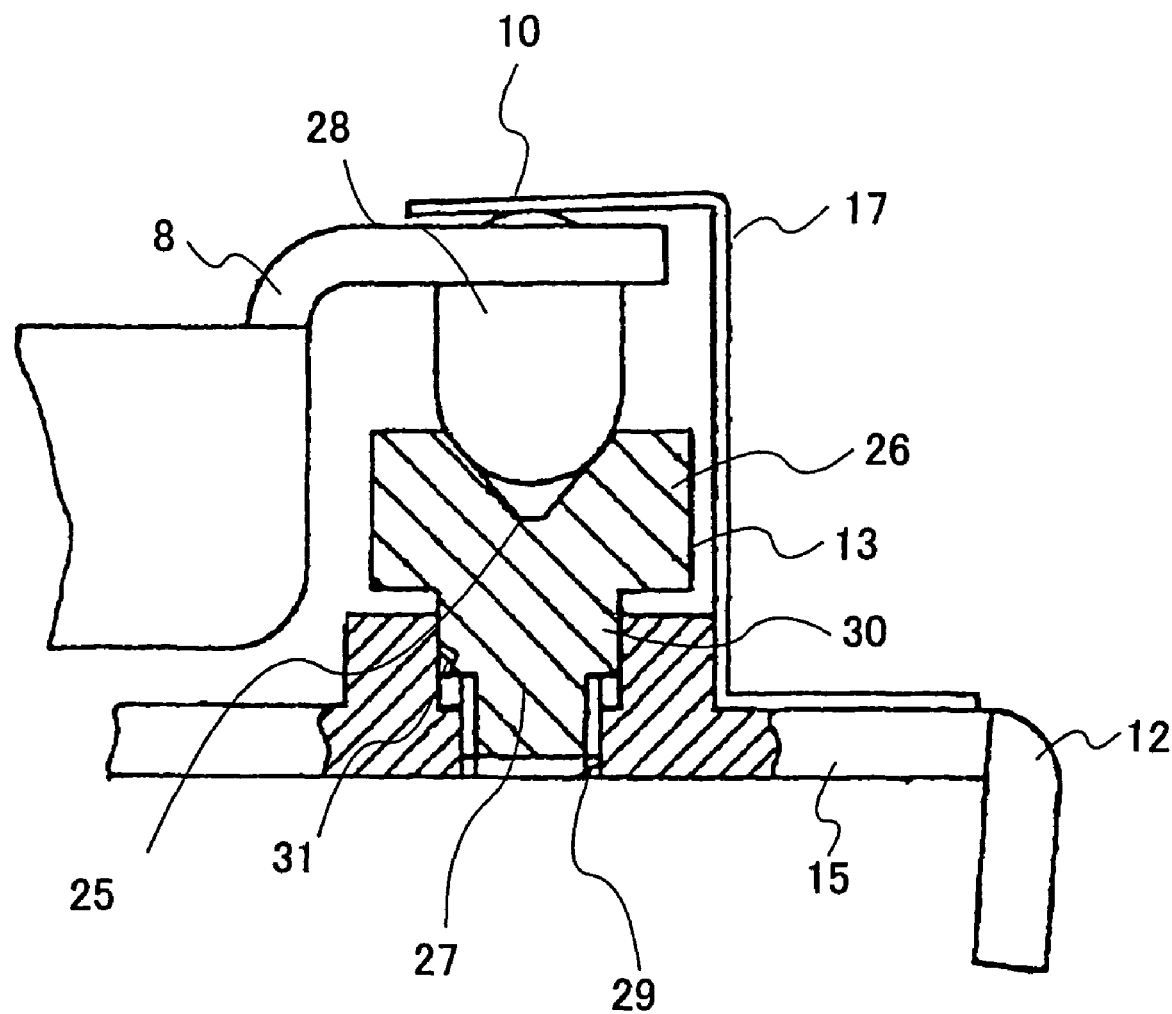
FIG. 4 is an enlarged cross-sectional view of a support mechanism according to a second embodiment of the present invention.

FIG. 4 is an enlarged cross-sectional view of a support mechanism according to a second embodiment of the present invention. In FIG. 4, the same elements as those described in the first embodiment are referred to by the same numerals, and a description thereof will be omitted.

The first pivot portion 10 (the support mechanism) according to the second embodiment differs from that according to the first embodiment in that the first pivot-receiving member 13 has a cylinder portion 30 provided between the head portion 26 and the male screw portion 27, and that an opening portion 31 having a circular cross section is formed on the female screw portion 29 formed in the holding arm portion 15 of the fixed chassis 12. The cylinder portion 30 of the first pivot-receiving member 13 fits into the opening portion 31 so that a position of the cylinder portion 30 is restricted by the opening portion 31.

Therefore, according to the second embodiment, when the male screw portion 27 of the first pivot-receiving member 13 is screwed into the female screw portion 29 formed in the holding arm portion 15 of the fixed chassis 12, the male screw portion 27 is properly screwed into the female screw portion 29 owing to a guide effect of the cylinder portion 30 and the opening portion 31, thus preventing the rotating chassis 8 from moving in a direction other than the direction in which the male screw portion 27 is screwed. Therefore, at a time of the tangential tilt adjustment, the rotating chassis 8 is prevented from being inadvertently moved in the directions of the thickness of the optical disk (focusing directions) or in the radial directions of the optical disk (tracking directions).

Figure 5:
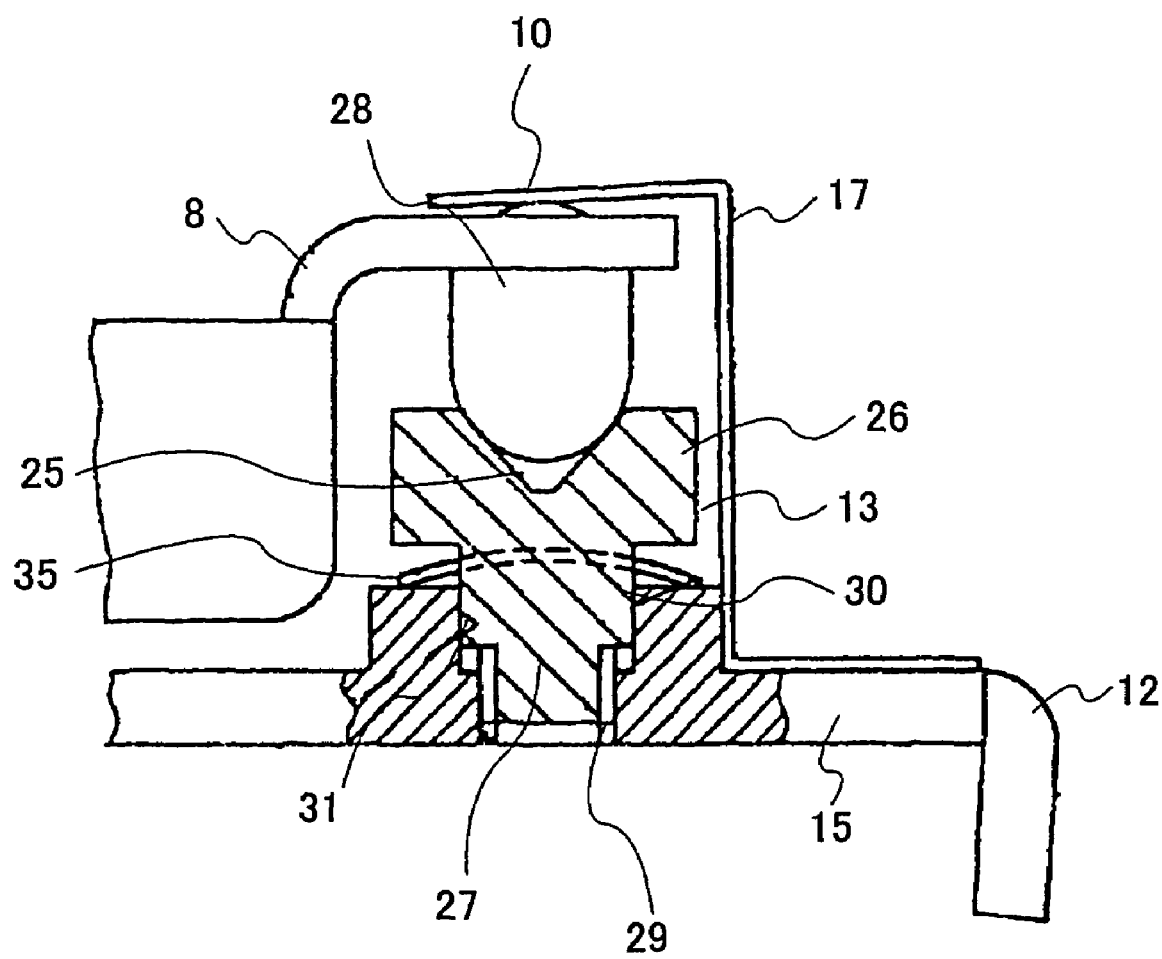
FIG. 5 is an enlarged cross-sectional view of a support mechanism according to a third embodiment of the present invention.

FIG. 5 is an enlarged cross-sectional view of a support mechanism according to a third embodiment of the present invention. In FIG. 5, the same elements as those described in the first and second embodiments are referred to by the same numerals, and a description thereof will be omitted.

The first pivot portion 10 (the support member) according to the third embodiment differs from that according to the second embodiment in that the first pivot-receiving member 13 includes an elastic member 35 interposed between the lower portion of the head portion 26 and the upper portion of the opening portion 31. The elastic member includes a spring washer, a leaf spring, and a coil spring.

Therefore, according to the third embodiment, when the male screw portion 27 of the first pivot-receiving member 13 is screwed into the female screw portion 29 formed in the holding arm portion 15 of the fixed chassis 12, the elastic member 35 is held and bent between the lower portion of the head portion 26 and the upper portion of the opening portion 31, thus causing a pressing force to press the first pivot-receiving member 13 and the fixed chassis 8 onto each other. Therefore, the thread ridges of the male screw portion 27 and the female screw portion 29 are pressed onto each other, thereby eliminating backlash from an engagement portion of the male screw portion 27 and the female screw portion 29. Thus, an instability after the tangential tilt adjustment is eliminated from the rotating chassis 8.

According to the respective above-described embodiments, in FIG. 1, a distance L1 between the first pivot portion 10 and the objective lens 3 of the optical pickup 2 and a distance L2 between the second pivot portion 11 and the objective lens 3 are determined so as to satisfy a condition L1>L2.

Figure 6:
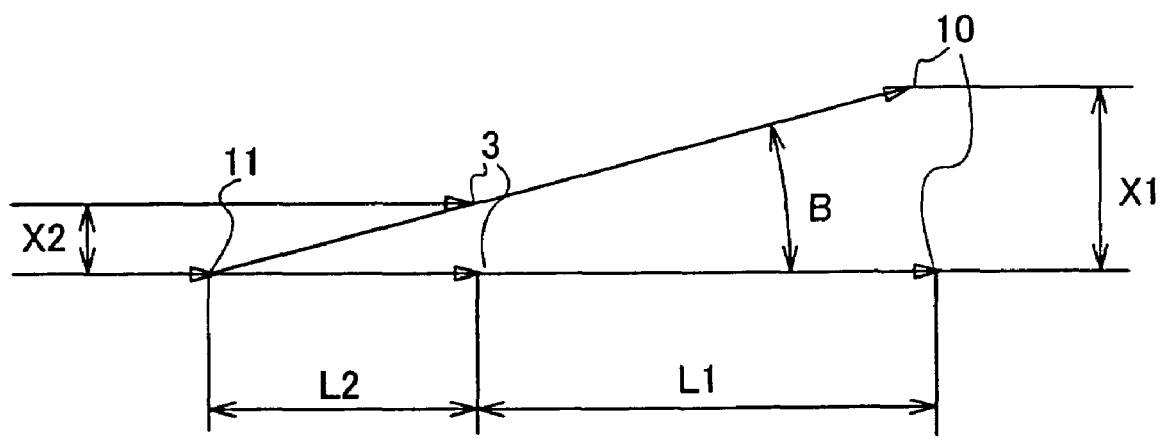
FIG. 6 is a diagram conceptually showing positional relations among first and second pivot portions, and an objective lens according to the embodiments of the present invention.

FIG. 6 is a diagram conceptually showing positional relations among the first and second pivot portions 10 and 11, and the objective lens 3. When the first and second pivot portions 10 and 11, and the objective lens 3 are located with the distances L1 and L2 as described above, the first pivot portion 10 is required to be moved a distance X1 so that the tangential tilt adjustment of an angle B is made. The direction of the movement is the direction of the thickness of the optical disk (the focusing direction). By this tangential tilt adjustment, the objective lens 3 can be moved a distance X2 in the focusing direction. The distance X2 is given by the following formula:

$$X2 = L2/(L1+L2) \times X1$$

An actuator performs a focusing operation so that the laser beam is focused onto the optical disk through the objective lens 3. Therefore, a longer distance X2 would require a longer stroke movement of the focusing operation of the actuator, thus enlarging a size of, or making thicker, the recording/reproduction apparatus. For this reason, the distance X2 should be kept minimum.

However, according to the above-described embodiments, since the distances L1 and L2 are determined to satisfy the condition L1>L2 as described above, the distance X2 which the objective lens 3 travels can be kept minimum. On the other hand, if the distances L1 and L2 are determined to satisfy a condition L1<L2, the distance X2 will be longer as is apparent from the above-described formula.

Figure 7:
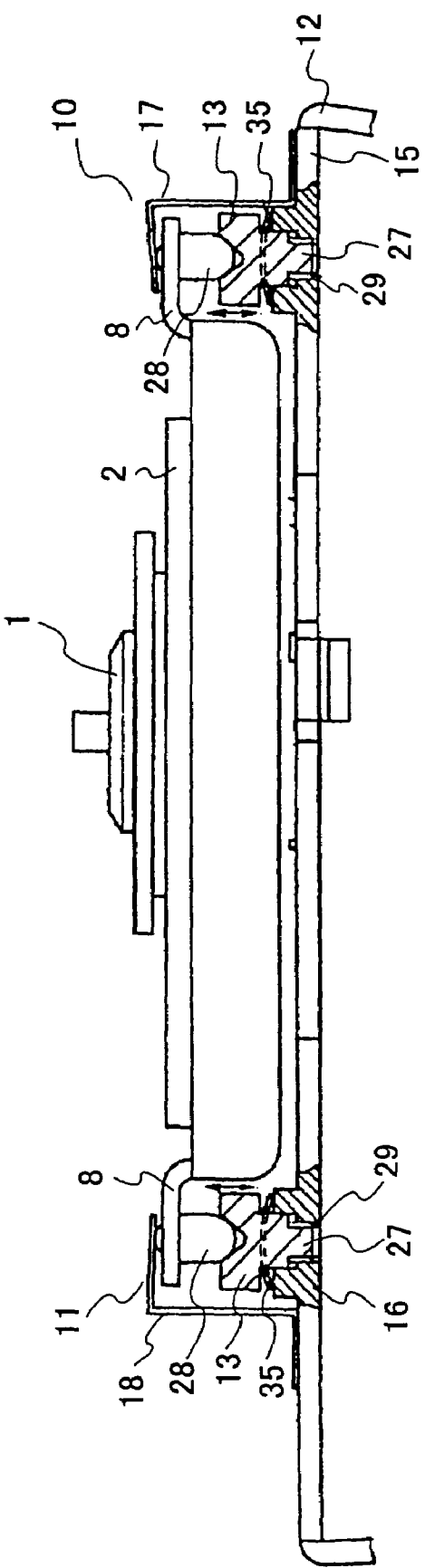
FIG. 7 is an enlarged sectional view of a principal part of a recording/reproduction apparatus according to a fourth embodiment of the present invention.

FIG. 7 is an enlarged sectional view of a principal part of a recording/reproduction apparatus according to a fourth embodiment of the present invention. In FIG. 7, the same elements as those described in the first through third embodiments are referred to by the same numerals, and a description thereof will be omitted.

According to the fourth embodiment, the above-described vertically movable structure of the support mechanism of the third embodiment is adopted in both of the first and second pivot portions 10 and 11.

Therefore, according to the fourth embodiment, the tangential tilt adjustment can be made by moving and adjusting one of the first pivot-receiving members 13 of the respective first and second pivot portions 10 and 11. Further, a height of the rotating chassis 8 can be adjusted by moving and adjusting the first pivot-receiving members 13 of the respective first and second pivot portions 10 and 11.

The height of the rotating chassis 8 is adjusted so that an error in a distance between heights of the optical disk and the optical pickup 2 can be reduced, which error is caused by irregularity of components and unevenness in assembling the components. Thus, the recording/reproduction apparatus can be made thinner.

The present invention is not limited to the specifically disclosed embodiments, and variations and modifications may be made without departing from the scope of the present invention.

The present invention is based on Japanese priority application No. 11-345075 filed on Dec. 3, 1999, the entire contents of which are hereby incorporated by reference.

What is claimed is:

1. An adjustment structure for adjusting a seek mechanism which moves an optical pickup that irradiates a light beam on an optical disk to record information on and/or reproduce information from the optical disk, said adjustment structure comprising:
   a base body; and
   a first support mechanism and a second support mechanism respectively provided on the base body,
   each of said first and second support mechanisms having a pivot-receiving member, and a pivot comprising a pin having a rounded tip end which engages the pivot-receiving member.

2. An optical disk apparatus comprising:
   a base body;
   a spindle motor, provided on the base body, configured to rotate an optical disk;
   an optical pickup configured to irradiate a light beam on the optical disk to record information on and/or reproduce information from the optical disk;
   a seek mechanism configured to move the optical pickup; and an adjustment structure configured to adjust the seek mechanism, said adjustment structure comprising:

a first support mechanism and a second support mechanism respectively provided on the base body, each of said first and second support mechanisms having a pivot-receiving member, and a pivot comprising a pin having a rounded tip end which engages the pivot-receiving member.

3. An adjustment structure for adjusting a chassis having provided thereon a seek mechanism which moves an optical pickup that irradiates a light beam on an optical disk to record information on and/or reproduce information from the optical disk, said adjustment structure comprising:

a base body; and at least two support mechanisms respectively configured to support the chassis in a manner free to tilt with respect to the base body, each of said support mechanisms having a pivot-receiving member, and a pin having a rounded tip end which engages the pivot-receiving member.

4. An optical disk apparatus comprising:

a base body;

a spindle motor, provided on the base body, configured to rotate an optical disk;

an optical pickup configured to irradiate a light beam on the optical disk to record information on and/or reproduce information from the optical disk;

a chassis;

a seek mechanism, provided on the chassis, configured to move the optical pickup in a radial direction of the optical disk; and at least two support mechanisms respectively configured to support the chassis in a manner free to tilt with respect to the base body, each of said support mechanisms having a pivot-receiving member, and a pin having a rounded tip end which engages the pivot-receiving member.

5. The adjustment structure as claimed in claim 1, wherein both of said first and second support mechanisms support the optical pickup in a manner movable in a focusing direction of the light beam with respect to the optical disk.

6. The optical disk apparatus as claimed in claim 2, wherein both of said first and second support mechanisms support the optical pickup in a manner movable in a focusing direction of the light beam with respect to the optical disk.

7. The adjustment structure as claimed in claim 3, wherein both of said support mechanisms support the chassis in a manner such that the chassis is movable in directions towards and away from the base body, such that the movement is in a direction perpendicular to a direction in which the seek mechanism moves the optical pickup.

8. The optical disk apparatus as claimed in claim 4, wherein both of said support mechanisms support the chassis in a manner such that the chassis is movable in directions towards and away from the base body, such that the movement is in a direction perpendicular to a direction in which the seek mechanism moves the optical pickup.

9. An adjustment structure for adjusting a seek mechanism which moves an optical pickup that irradiates a light beam on an optical disk to record information on and/or reproduce information from the optical disk, said adjustment structure comprising:

a base body; and a first support mechanism and a second support mechanism respectively provided on the base body, each of said first and second support mechanisms having a pivot-receiving member, and a pin having a rounded tip end which engages the pivot-receiving member, wherein both of said first and second support mechanisms support the optical pickup in a manner movable in a focusing direction of the light beam with respect to the optical disk, and wherein said pin is inserted into said pivot-receiving member in said focusing direction of the light beam with respect to the optical disk.

10. An optical disk apparatus comprising:

a base body;

a spindle motor, provided on the base body, configured to rotate an optical disk;

an optical pickup configured to irradiate a light beam on the optical disk to record information on and/or reproduce information from the optical disk;

a seek mechanism configured to move the optical pickup; and an adjustment structure configured to adjust the seek mechanism, said adjustment structure comprising:

a first support mechanism and a second support mechanism respectively provided on the base body, each of said first and second support mechanisms having a pivot-receiving member, and a pivot comprising a pin having a rounded tip end which engages the pivot- receiving member, wherein both of said first and second support mechanisms support the optical pickup in a manner movable in a focusing direction of the light beam with respect to the optical disk and wherein said rounded tip end of said pin faces said focusing direction of the light beam with respect to the optical disk.

11. The adjustment structure of claim 7, further comprising guide rails for movably supporting said optical pickup on said chassis, said guide rails being separate from said pins of said support mechanisms.

12. The optical disk apparatus of claim 8, wherein said support mechanisms are located between said chassis and said base body.

* * * * *